(12) United States Patent
Thomas et al.

(10) Patent No.: US 11,005,906 B2
(45) Date of Patent: May 11, 2021

(54) UPDATING PART OF A MANIFEST FILE ON THE BASIS OF PATCHES

(71) Applicant: Koninklijke KPN N.V., Rotterdam (NL)

(72) Inventors: Emmanuel Thomas, Delft (NL); Lucia D'Acunto, Delft (NL); Ray Van Brandenburg, Rotterdam (NL); Mattijs Oskar Van Deventer, Leidschendam (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 0 days.

(21) Appl. No.: 16/060,356

(22) PCT Filed: Dec. 9, 2016

(86) PCT No.: PCT/EP2016/080438
§ 371 (c)(1),
(2) Date: Jun. 7, 2018

(87) PCT Pub. No.: WO2017/097978
PCT Pub. Date: Jun. 15, 2017

(65) Prior Publication Data
US 2018/0367592 A1 Dec. 20, 2018

(30) Foreign Application Priority Data
Dec. 11, 2015 (EP) .................................... 15199569

(51) Int. Cl.
*H04L 29/06* (2006.01)
(52) U.S. Cl.
CPC ........ *H04L 65/608* (2013.01); *H04L 65/4076* (2013.01); *H04L 65/4084* (2013.01);
(Continued)

(58) Field of Classification Search
USPC ........................................................ 709/219
See application file for complete search history.

(56) References Cited

U.S. PATENT DOCUMENTS

| 2005/0132356 | A1* | 6/2005 | Cross | G06F 8/658 717/174 |
| 2009/0007093 | A1* | 1/2009 | Lin | G06F 11/08 717/174 |

(Continued)

FOREIGN PATENT DOCUMENTS

| CN | 102480494 A | 5/2012 |
| CN | 103081433 A | 5/2013 |

(Continued)

OTHER PUBLICATIONS

Notification of Transmittal of The International Search Report and The Written Opinion of the International Searching Authority, or the Declaration for International Application No. PCT/EP2016/080438, "Updating Part of a Manifest File on the Basis of Patches", dated Feb. 24, 2017.

(Continued)

*Primary Examiner* — Hermon Asres
(74) *Attorney, Agent, or Firm* — Hamilton, Brook, Smith & Reynolds, P.C.

(57) ABSTRACT

A method is described for providing one or more patches to a client device. The method may comprise determining manifest file version information of a manifest file that is used by the client device; detecting an indication that one or more patches have been missed, a patch comprising information for updating at least part of information in the manifest file; requesting one or more missed patches on the basis of the manifest file version information (and the version information of the manifest file that the client would obtain after having applied the last missed patch—if avail- (Continued)

able); and, receiving the one or more missed patches for updating the information in the manifest file.

14 Claims, 7 Drawing Sheets

(52) U.S. Cl.
CPC .......... *H04L 65/601* (2013.01); *H04L 65/602* (2013.01); *H04L 65/604* (2013.01); *H04L 65/607* (2013.01); *H04L 65/80* (2013.01)

(56) References Cited

U.S. PATENT DOCUMENTS

| | | | |
|---|---|---|---|
| 2012/0198031 A1* | 8/2012 | Bouazizi | H04N 21/84 709/219 |
| 2014/0189147 A1 | 7/2014 | Keum et al. | |
| 2015/0019629 A1 | 1/2015 | Giladi | |
| 2015/0081838 A1 | 3/2015 | Stockhammer et al. | |
| 2015/0334157 A1 | 11/2015 | Oyman et al. | |
| 2016/0366118 A1* | 12/2016 | Wang | H04L 63/0807 |

FOREIGN PATENT DOCUMENTS

| | | |
|---|---|---|
| CN | 103095838 A | 5/2013 |
| CN | 103327009 A | 9/2013 |
| CN | 103995892 A | 8/2014 |
| CN | 103999033 A | 8/2014 |
| CN | 104488246 A | 4/2015 |
| CN | 105045608 A | 11/2015 |
| CN | 105144728 A | 12/2015 |
| WO | WO 2012/009454 A1 | 1/2012 |

OTHER PUBLICATIONS

3rd Generation Partnership Project: Technical Specification Group Services and System Aspects: Transparent end-to-end Packet-switched Streaming Service (PSS); Progressive Download and Dynamic Adaptive Streaming over HTTP (36P-DASH), vol. SA WG4, No. V13.2.0; Dec. 5, 2015.

European Search Report for EP Application No. 15 19 9569, "Updating Part of a Manifest File on the Basis of Patches", dated Jun. 6, 2016.

"Core Experiment on DASH Push Events," International Organisation for Standardisation Organisation Internationale de Normalisation, ISO/IEC JTC1/SC29/WG11, Coding of Moving Pictures and Audio, Geneva, Switzerland, 4 pages (Jan. 2013).

3GPP TS 26.247 V13.0.0 (Dec. 2014) Technical Specification, 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 13), 119 pages (2014).

Berners-Lee, T. et al., "Uniform Resource Identifier (URI): Generic Syntax", RFC 3986, 62 pages, Dated: Jan. 2005, Retrieved from the Internet on: Jun. 9, 2020, Retrieved from the Internet at: http://tools.ietf.org/html/rfc3986 .

Giladi, Alex et al., "Patching MPD's: techniques for efficient MPD updates," International Organisation for Standardisation Organisation Internationale de Normalisation, ISO/IEC JTC1/SC29/WG11, Coding of Moving Pictures and Audio, Geneva, Switzerland, 6 pages (Jan. 2013).

MPEG DASH, "Information technology—Dynamic adaptive streaming over HTTP (DASH)—Part 1: Media presentation description and segment formats", ISO/IEC FDIS 23009-1:2013(E), 23009-1-FDIS-clean.doc, Retrieved from the Internet on: Feb. 8, 2013, Retrieved from the Internet at: http://standards.globalspec.com/std/2040908/iso-iso-iec-fdis-23009-1 .

MPEG DASH, "Information technology—Dynamic adaptive streaming over HTTP (DASH)—Part 5: Server and network assisted DASH (SAND)", ISO/IEC CD 23009-5, Feb. 19, 2015.

[ETS300707] ETSI, "Electronic Programme Guide (EPG); Protocol for a TV Guide using electronic data transmission", 87 pages, Dated: Jun. 1996, Retrieved from the Internet on: Jun. 9, 2020, Retrieved from the Internet at: http://www.etsi.org/deliver/etsi_i_ets/300700_300799/300707/01_20_107/ets_300707e01e.pdf .

Stockhammer, Thomas, "DASH Defects under Investigation," International Organisation for Standardisation Organisation Internationale de Normalisation, ISO/IEC JTC1/SC29/WG11, Coding of Moving Pictures and Audio, Valencia, Spain, 7 pages (Apr. 2014).

Urpalainen, J., (Nokia) "An Extensible Markup Language (XML) Patch Operations Framework Utilizing XML Path Language (XPath) Selectors", RFC 5261, 41 pages, Dated: Sep. 2008, Retrieved from the Internet on: Jun. 9, 2020, Retrieved from the Internet at: https://tools.ietf.org/html/rfc5261 .

\* cited by examiner

UPDATING PART OF A MANIFEST FILE ON THE BASIS OF PATCHES

RELATED APPLICATIONS

This application is the U.S. National Stage of International Application No. PCT/EP2016/080438, filed Dec. 9, 2016, which designates the U.S., published in English, and claims priority under 35 U.S.C. § 119 or 365(c) to EP Application No. 15199569.3, filed Dec. 11, 2015. The entire teachings of the above applications are incorporated herein by reference.

FIELD OF THE INVENTION

The invention relates to updating part of a manifest file, and, in particular, though not exclusively, to methods and systems for enabling transmission of one or more missed patches to a client device, a client device adapted for receiving one or more missed patches and server for enabling transmission of one or more missed patches to a client device, data structures such as manifest files and/or patch data structures for enabling a client device to request one or more missed patches and a computer program product for executing such methods.

BACKGROUND OF THE INVENTION

In order for a client device to be able to retrieve media data comprising audio and/or visual content from a streaming server, the client device needs to retrieve metadata specifying where the content can be found. Within the context of HTTP adaptive streaming (HAS), metadata may be provided to a client device using a so-called manifest file, which in MPEG-DASH is referred to as a media presentation description (MPD). A manifest file may also contain information about the availability and location of variations of the same content (e.g. the same content in different resolutions, different encoding types, different language and/or subtitle versions, etc.) and whether the content refers to a live-event (e.g. as in broadcasting) or video on-demand. Hence, the manifest file allows a client device to select and retrieve the most appropriate version of the content that is available given for example the capabilities of the playback device and of the network/broadcast link.

When streaming live media data to client devices, it is necessary to keep the information in a manifest file (i.e. metadata for playout of live content) up-to-date. To that end, a manifest file may be updated so that it allows contains the most recently available segments. For example, the MPEG-DASH standard includes an MPD update process wherein the client device is periodically signaled to request a new version of the MPD. A client device may thus periodically request and receive a version of the manifest file from a server.

In order to reduce bandwidth and signalling, the MPEG DASH standard further includes a so-called a patch mechanism in order to update only a part of a live-stream MPD that is used by a DASH client. To that end, a streaming server may include an MPD patch in a segment box in one or more segments that are sent in-band to the DASH client devices. The MPD patch comprises metadata in the form of a set of instruction for replacing certain parts of a certain manifest file with information that is contained in the patch. Applying a patch to a certain version i of the MPD, permits to obtain a further version j of the MPD. Using the patch mechanism, the streaming server is able to inform the client device (e.g. the function at the client device handling the HTTP adaptive streaming such as a MPEG DASH client application) by including patch information in a segment box, which is part of a segment retrieved by the client device. The MPD patch mechanism, unlike the regular MPD update, is not dependent upon the client device actively requesting a patch. In addition, the MPD patch mechanism allows to save a considerable amount of bandwidth, since a client device only needs to receive the difference between versions i and j, as compared to a regular MPD update wherein each time a full new version of the MPD is sent to the client device.

Although the MPD patch mechanism saves bandwidth by sending a patch for a live-stream MPD inside a segment, a client device may miss a patch, for example due to packet loss (in broadcast or multicast systems), or due to user activity such as pause/resume. E.g. a client device may skip retrieval of certain segments, for example after having paused the streaming, and jump ahead in the content timeline. Alternatively, after having received a MPD, a client may not immediately start watching content (and retrieving segments) from the 'start' of the content (e.g. the first segment of a content, but may decide to jump start, skip one or more segments and retrieve segments from a later moment on the 'content timeline'. If patches are missed by the (HAS) client the content playout may be seriously disrupted.

Hence, there is a need in the art for improved methods and systems for providing manifest file updates to a HAS client. In particular, there is a need in the art for improved schemes for updating a manifest file. In particular, there is a need in the art for resilient patch update mechanisms that enable continuous playback of a HAS media stream even when during streaming one or more patches are missed or cannot be applied by a client device.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a scripting language for web pages like JavaScript or PHP, an object oriented programming language such as Java™, JavaScript, Smalltalk, C++, Python or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In particular, the patch update schemes in this disclosure aim to reduce the problems associated with the conventional patch schemes as e.g. described in the MPEG DASH specification by introducing client and server functionality that enable a client device to monitor patches it receives, to detect missed patches and to request missed patches from the network (e.g. a server), to receive the missed patches and to apply the missed patches to the current manifest file on the basis of the thus received missed patches so that continuous playback of content is guaranteed or at least the risk of a discontinuity in the playback is substantially reduced. Here, the term "a missed patch" refers to a patch sent to the client device but that is not applied by the client device to the manifest file it is using. The manifest file to which the patch should be applied to may be identified in the patch. For example, a patch is not (cannot) applied by the client device to the manifest file it is using in case the patch was not received by the client device. Alternatively, a patch is not (cannot) applied in case it is corrupted or in case it comprises metadata, e.g. instructions or identifiers, that do not match with the information in the current manifest file.

In an aspect, the invention may relate to a method for enabling transmission of one or more missed patches to a client device, e.g. an HTTP adaptive streaming client device, comprising: preferably the client device detecting a missed patch indication, the missed patch indication signalling to the client device, that one or more patches have been missed by the client device, each of the one or more patches comprising information for updating at least part of a manifest file used by the client device; preferably the client device determining a first identifier indicative of a manifest file version of the manifest file used by the client device; and, preferably the client device sending the first identifier to a server for enabling the server to determine one or more missed patches on the basis of the first identifier.

In an embodiment, the client device may be a HAS client device that is configured to communicate with the network (e.g. a server) on the basis of a HTTP Adaptive Streaming protocol. The HTTP Adaptive Streaming protocol is preferably based on the MPEG DASH standard (ISO/IEC 23009-1) or a derivative thereof such as 3GP DASH. In these embodiments the client device may also be referred to as a MPEG DASH or 3GP DASH client device.

Hence, a client device, such as a HAS client device that is adapted to retrieve content using a HTTP adaptive streaming protocol, is configured to detect whether one or more patches have been missed and, in the event that missed patches are detected, it uses manifest file version information of the manifest file that is currently used by the client device to request the network, preferably a server in the network, to transmit one or more patches that were missed by the client device to the client device. Detection whether one or more patches have been missed may be based on events that occur at the side of the client device. For example the failure to attempt to fetch a new segment fails (probably due to a URL change); the reception of the last segment in the MPD (implying that the list of segments is not up to date with the newly produced ones); or an indication that the timer set on the minumumUpdatePeriod attribute of the MPD has elapsed are non-limiting examples of events that can be interpreted by the client device that one or more patches are missed by the client device.

When compared with known patch mechanisms for updating part of a manifest file, the patch mechanisms according to the invention are resilient against errors that may occur during the patch process. This way the risk that the errors during the patch process negatively influence the user experience during streaming is substantially reduced.

Information that is indicative of a manifest file version may e.g. comprise time information associated with a time instance at which the last version update of the manifest file took place. The network, e.g. a specialized network node such as a manifest file server in the network, may then determine which patches were sent to client devices within the period defined by the time information and the time the request for missed patches was received by the network. The network (a node in the network) may determine that these patches were missed by the client device and send these patches to the client device.

A manifest file version may be identified on the basis of information associated with the manifest file, e.g. one or more manifest file version identifiers. This information may be referred to as version information. In an embodiment, the version information may further include a time parameter, e.g. a time-stamp or the like, indicating a time the manifest file was last changed or published (e.g. made available to client devices). For example, in an embodiment, in case of a MPEG-DASH MPD, the so-called publish time attribute of an MPD may be used as a manifest file version identifier. The publish time may be contained in the manifest file (the MPD) as an attribute of the <MPD> root element. In a further embodiment, the MPD publish time may be used in combination with the MPD file name in order to uniquely identify a MPD version.

In another embodiment, information on the manifest file version may include a unique number, e.g. a number-used-only-once (nonce) such as a sequence number. In yet another embodiment, an manifest file version identifier may be realized on the basis of a hash value, for example a hash value based on (part of) the information in the MPD. In that case, both client and MF server may be configured to compute hash values for manifest files so that the hash value will uniquely define a version of a manifest file.

In a further yet embodiment, the ETag scheme as described in rfc7232 section-2.3 may be used for determining different versions of a manifest file. In the ETag scheme, a Manifest File (MF) server may assign a unique value string (e.g. a hash value or the like) to each version of a manifest file. When transmitting a manifest file to a client device on the basis of a HTTP response message, e.g. an HTTP 200 OK message, the corresponding ETag may be inserted in the header of the HTTP response message. When receiving the manifest file, the client device may extract the ETag from the HTTP header. In this case, the ETag will uniquely identify a version of a manifest file. Identification of the manifest file version on the basis of unique numbers, nonces, hashes or ETag provides the advantage that the server that is configured to determine the missed patches does not need to be DASH aware.

In an embodiment, detecting that one or more patches have been missed by the client device (this may also be formulated throughout this application as detecting a missed patch indication) may include: preferably the client device, receiving a patch that cannot be applied to the manifest file used by the client device; Preferably the client device determining a second identifier indicative of a patch version of the received patch; or, indicative of a manifest file referenced by the received patch; preferably the client device sending the second identifier to the server for enabling the server to determine one or more missed patches on the basis of the first and second identifier.

Hence, in this embodiment, the client device (or a patch detector device associated with the client device) may detect that one or more patches have been missed by the client device by determining that a received patch cannot be applied by the client device because e.g. it refers to a version of a manifest file (e.g. a more recent version) that does not match with the version of the manifest file the client device is currently using; or, it comprises an instruction (e.g. add/delete/replace relative) to an element that does not exist in the MPD the client device is using. Such event (e.g. in the form of an error code) may be interpreted by the client device as an indication that one or more patches have been missed by the client device (or in other words it is interpreted/signaled as a missed patch indication).

In response, the second identifier may be sent to the server for enabling the server to determine one or more missed patches on the basis of the first and second identifier. For example, when the first identifier defines a first time instance (e.g. a first publish time attribute of an MPD) and the second identifier defines a second time instance (e.g. a second publish time attribute of an MPD identified in the patch), the server may determine a time interval on the basis of the first and second time instances in which patches were missed by the client device.

In an embodiment, the first and/or second identifier may be sent in a patch request message to the server. In an embodiment, the patch request message may be an HTTP message such as an HTTP GET, HTTP HEAD, or HTTP POST message.

In another embodiment, a new HTTP request, called an HTTP DIFF request, may be used wherein missed patch information may be sent in the header or in the body of the HTTP message. In yet another embodiment, the missed patch information may be sent in a Server and Network Assisted DASH (SAND) message, a messaging protocol between DASH client and DASH server wherein the client may transmit (periodic) "status updates" to the server regarding the missed patch information.

In an embodiment, the patch request message may comprise a first (query) parameter indicative of the manifest file version the client device is using; and/or, a second (query)

parameter indicative of the patch version of the received patch that cannot be applied; or, indicative of the manifest file referenced in the received patch that cannot be applied. Hence, the identifiers may be efficiently transmitted in a patch request, e.g. an HTTP request message, to the server.

In an embodiment, the method may further comprise: preferably the client device receiving one or more missed patches; and, applying at least part of the one or more patches to the manifest file.

In an embodiment, the manifest file may comprise location information of a server that is configured to determine one or more missed patches on the basis of one or more identifiers, preferably one or more identifiers that are indicative of manifest file versions.

In a further aspect, the invention may relate to a method for transmitting one or more missing patches to a client device, preferably an HTTP adaptive streaming (HAS) client device.

In an embodiment, the method may comprise: receiving a first identifier indicative of a manifest file version of a manifest file that is used by the client device; determining whether one or more patches were missed by the client device on the basis of at least the first identifier; and, if it is determined that one or more patches were missed by the client device, transmitting at least part of the one or more missed patches to the client device.

In an embodiment, the method may further comprise: receiving a second identifier indicative of a patch version of at least one patch received by the client device; or, indicative of a manifest file version referenced by at least one patch received by the client device; and, determining whether one or more patches were missed by the client device on the basis of the first and second identifier.

In an embodiment, the first identifier and/or second identifier may be included as a first and/or second query parameter in a patch request message sent by the client device, preferably the patch request message being an HTTP message.

In an embodiment, the method may include: using the first identifier, the second identifier and version information for determining if one or more patches were missed by the client device, the version information being stored on a storage medium and comprising information on manifest files and/or patches that were transmitted to the client device before a missed patch indication was detected by the client device (e.g. before the client device detected that one or more patches have been missed by the client device).

In an aspect, the invention may relate to a server for transmitting manifest file update information to a client device comprising: a computer readable storage medium having computer readable program code embodied therewith, and a processor, preferably a microprocessor, coupled to the computer readable storage medium, wherein responsive to executing the first computer readable program code, the processor is configured to perform executable operations comprising: receiving a first identifier indicative of a manifest file version of a manifest file that is used by the client device; determining whether one or more patches were missed by the client device on the basis of at least the first identifier; and, if it is determined that one or more patches were missed by the client device, transmitting at least part of the one or more missed patches to the client device.

In an embodiment, the server is configured for being connectable to, or comprises a storage medium comprising version information on manifest files and/or patch versions that were transmitted to the client device.

In an embodiment, the executable operations may further comprise: receiving a second identifier indicative of a patch version of at least one patch received by the client device; or, indicative of a manifest file version referenced by at least one patch received by the client device; and, determining whether one or more patches were missed by the client device on the basis of the first and second identifier; using the first identifier, second identifier and the version information for determining if one or more patches were missed by the client device.

In an aspect, the invention may relate to a client device, preferably an HTTP adaptive streaming device, for requesting a server transmission of manifest file update information comprising: a computer readable storage medium having at least part of a program embodied therewith, the computer readable storage medium comprising a manifest file; and, a computer readable storage medium having computer readable program code embodied therewith, and a processor, preferably a microprocessor, coupled to the computer readable storage medium, wherein responsive to executing the computer readable program code, the processor is configured to perform executable operations comprising: detecting that one or more patches have been missed by the client device, each of the one or more patches comprising information for updating at least part of a manifest file, preferably a dynamic manifest file, used by the client device;
determining a first identifier indicative of a manifest file version of the manifest file used by the client device; and, sending the first identifier to a server for enabling the server to determine one or more missed patches on the basis of the first identifier and to transmit the missed patches to the client device.

In an aspect, the invention may relate to a non-transitory computer-readable storage media comprising a manifest file for a client device, the manifest file comprising computer readable program code, the code comprising: an identifier indicative of the version of a manifest file; one or more chunk identifiers, preferably one or more URLs, for enabling the client device to request chunks from a media server; and, a missed patch request indicator, preferably the missed patch request indicator comprising an UrlQueryInfo element, for signaling to the client device that a patch request message can be sent to a server if the client device detects that one or more patches have been missed by the client device (e.g. detects a missed patch indication).

In an aspect, the invention may relate to a non-transitory computer-readable storage media for storing a data structure, preferably a composite patch data structure configured for updating a manifest file used by a client device, preferably an HTTP adaptive streaming client device, the data structure comprising computer readable program code, the code comprising: an identifier indicative of the version of the composite patch data structure; a plurality of patch data structures, each patch data structure comprising a patch version identifier, a manifest file version identifier, manifest file update information and instructions for the client device to update on the basis of the manifest file update information at least part of a manifest file used by the client device and identified by the manifest file version identifier.

The invention may also relate to a program product comprising software code portions configured for, when run in the memory of a computer, executing any of the method steps described above.

The invention will be further illustrated with reference to the attached drawings, which schematically will show embodiments according to the invention. It will be understood that the invention is not in any way restricted to these specific embodiments.

DETAILED DESCRIPTION

Figure 1:
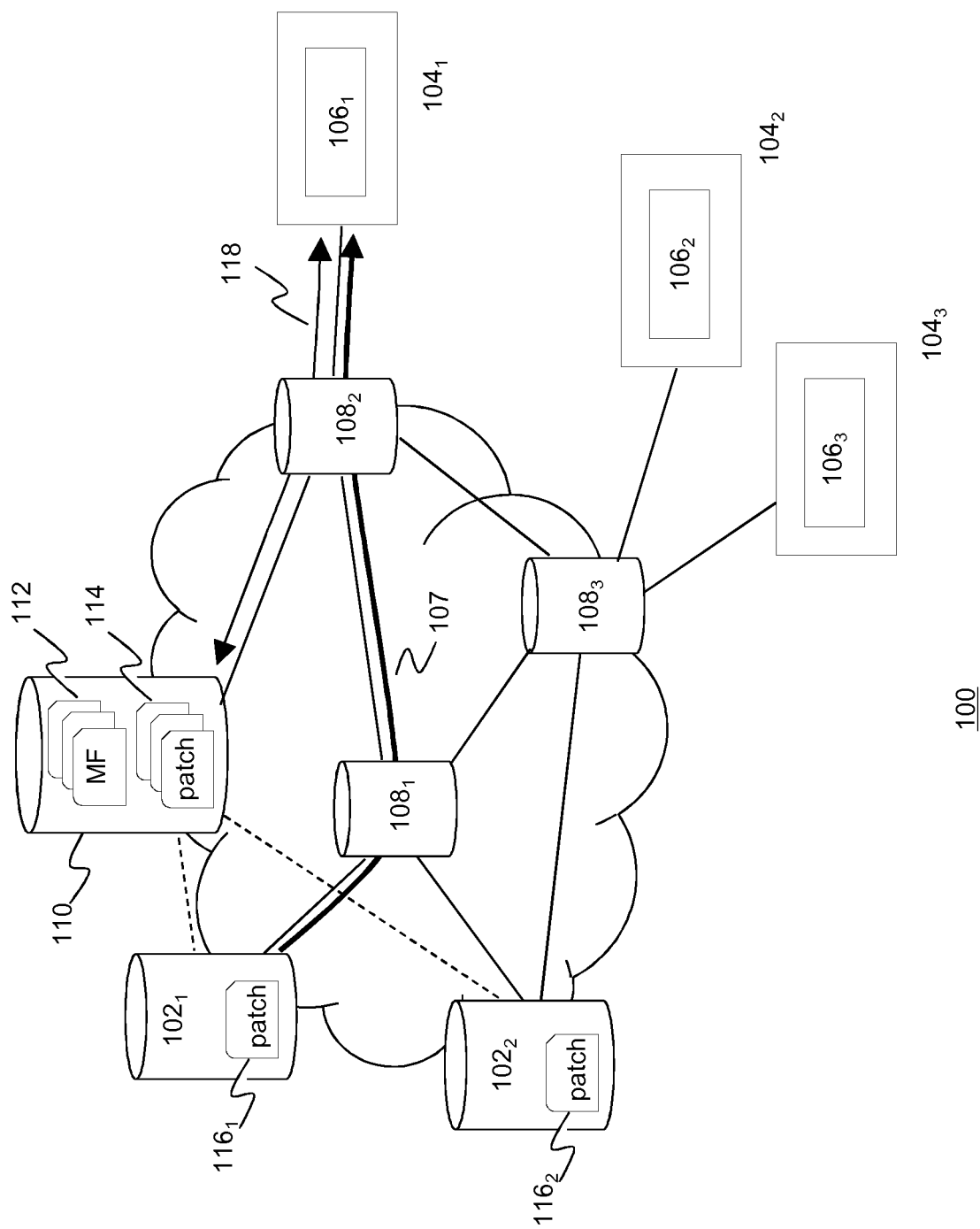
FIG. 1 schematically depicts a media delivery system for streaming media data to a client device according to an embodiment of the invention.

FIG. 1 schematically depicts a media delivery system for streaming media data to a client device according to an embodiment of the invention. In particular, FIG. 1 depicts a one or more media sources $102_{1,2}$, e.g. one or more media servers, configured for storing video data on the basis of a predetermined data format and to stream the video data using a suitable streaming to media processing devices $104_{1-3}$. A media processing device may generally relate to a content processing device, e.g. a (mobile) content play-out device such as an electronic tablet, a smart-phone, a notebook, a media player, a television, etc. In some embodiment, a media device may be a set-top box or content storage device configured for processing and temporarily storing content for future consumption by a media play-out device. A media processing device may comprise a client device $106_{1-3}$ configured for requesting media data from the one or more media servers in the network.

A media server may transmit media data 107 via one or more network nodes $108_{1-3}$ (proxies, caches, etc.) to a client device using an adaptive streaming technique, e.g. HAS streaming technique that transfers chunked or segmented video over HTTP to client devices that are implemented on the media processing devices. A chunk may be referred to as a (media) fragment (stored as part of a larger file) or a (media) segment (stored as separate files). Segments may comprise media data for playout, typically between 2 (e.g., Microsoft Smooth Streaming) and 10 seconds (e.g., Apple HTTP Live Streaming).

A chunk may be available in different quality representations thereby enabling a client device to seamlessly adapt the quality (e.g. the bitrate) of the video from one chunk to the next, based on current network conditions and device conditions. Information on the network location(s) (usually in the form of a URL) from which chunks may be retrieved is stored in a manifest file. In Dynamic Adaptive Streaming over HTTP (DASH), the MPEG HAS standard, the manifest file is also referred to as the Media Presentation Description (MPD).

At the start of a live-streaming streaming session, a client device may request a manifest file 112 from a network node 110, e.g. a manifest file (MF) server associated with the media servers $102_{1,2}$, in the network. The manifest file may comprise chunk or segment identifiers (or information to determine such identifiers) and the quality representations of the chunks associated with a video title. The client may start requesting chunks by transmitting chunk request messages, e.g. HTTP request messages, to a media server and receive chunk response messages, e.g. HTTP response messages, comprising the requested chunks as payload.

Once the information in the manifest file is outdated (e.g. because all segments in the manifest file are requested), the manifest file needs to be updated. In that case, the client device may request a new manifest file from the MF server. Alternatively, the MF server may periodically push a new manifest file to the client device, and the client device may replace this new manifest file with the (soon to be) outdated manifest file so that continuous playout of the media data is guaranteed.

In some situations it is advantageous to update only part of the manifest file. For example, the MPEG DASH specification describes a patch mechanism that allows a media server to provide an update of an MPD that is used by a DASH client device by including an MPD patch $116_{1,2}$ in a segment box of a media segment transmitted to the client device. The MPD patch may contain metadata, e.g. instructions and information that needs to be inserted in the manifest file, which—once applied to a certain MPD version i of the MPD—permits to obtain a further MPD version j. For example, if the BaseURL in the following live-streaming MPD:

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011
    DASH-MPD.xsd"
    type="dynamic"
    minimumUpdatePeriod="PT2S"
    timeShiftBufferDepth="PT30M"
    availabilityStartTime="2015-05-06T07:31:03"
    minBufferTime="PT4S"
    publishTime="2015-05-06T07:37:19Z"
    profiles="urn:mpeg:dash:profile:isoff-live:2011">
    <BaseURL>http://cdn1.example.com/sample.MPD</BaseURL>
    <Period id="1">
    ...
    </Period>
</MPD>
```

Example 1: MPD Stored in the Memory of a Client Device needs to be changed to the address http://cdn2.example.com/sample.MPD, a patch may be inserted into one of the segments that is transmitted by the media server to the clients. An MPD that may be updated, i.e. fully by a MPD update request or partly by a patch, from a first to a second MPD version may be referred to as a dynamic MPD. As shown in example 1 the MPD comprises an MPD attribute "type=dynamic" for signaling the client device that the MPD is a dynamic MPD. A dynamic MPD may be used for live-streaming or broadcast situations. For example, the dynamic MPD in example 1 is used in a live-streaming session as signalled in the MPD to the client device by the live-streaming attribute profile.

Using the patch mechanism, the streaming server may inform a client device on a partial update of the manifest file by including patch information, metadata, in a segment box of a segment transmitted to the client device. A patch may look as follows:

```
<?xml version="1.0" encoding="UTF-8"?>
<diff>
  <replace sel="MPD[@publishTime="2015-05-
06T07:37:19Z"]/BaseURL/text( )[1]">http://cdn2.example.com/
sample.MPD</replace>
  <replace sel="MPD[@publishTime="2015-05-06T07:37:19Z"]/
@publishTime">2015-05-06T07:52:21Z</replace>
</diff>
```

Example 2: Patch for Updating the Dynamic MPD of Example 1

When the client device receives the segment containing the event message box, it may recognize that it contains a patch and that the patch is to be applied to the current MPD version that is stored in the memory of the client device. To that end, the patch comprises manifest version information that is indicative of the version of a manifest file (in this example an MPD). Here the MPD that the patch refers to is the MPD related to the content where the event message box transporting the patch was included. Further, the MPD version may be identified by a time parameter indicating the time (or date and time) when the MPD was last changed. For example, an MPD publishTime attribute may be used as a time parameter for identifying an MPD version. For example, the MPD in the patch of example 2 comprises publishTime="2015-05-06T07:37:19Z", for identifying the MPD to which the MPD should be applied to (here the MPD of example 1).

Once the MPD the patch refers to has been identified, a patch integrator 222 may parse the patch and apply it to the MPD the client device is using by executing its instructions on the basis of the information in the patch. After application of the patch, the partly updated MPD may look as follows:

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011
  DASH-MPD.xsd"
  type="dynamic"
  minimumUpdatePeriod="PT2S"
  timeShiftBufferDepth="PT30M"
  availabilityStartTime="2015-05-06T07:31:03"
  minBufferTime="PT4S"
  publishTime="2015-05-06T07:52:21Z"
  profiles="urn:mpeg:dash:profile:isoff-live:2011">
  <BaseURL>http://cdn2.example.com/sample.MPD</BaseURL>
  <Period id="1">
  ...
  </Period>
</MPD>
```

Example 3: MPD Updated on the Basis of the Patch of Example 2

The updated MPD has a new further version number as indicated by the publishTime attribute.

Hence, from the above it follows that the patch mechanism may be used by the network in order to instruct a client device to partly change (update) the current MPD by including patch information (i.e. metadata) comprising a difference ("diff") between the current MPD and the next version of the MPD and instructions to modify the current manifest file on the basis of the difference, in a segment box which is sent to the client device. This way, the MPD patch mechanism may be used to periodically update a dynamic MPD during a live-streaming session thereby saving a considerable amount of bandwidth, since the DASH client only needs to receive the difference between versions i and j.

Although the standard MPEG DASH patch mechanism saves bandwidth by sending a patch in a segment to the client device, patches may be missed by the client device, for example due to packet loss (in broadcast or multicast systems), or due to user activity such as play/resume. If it is determined that a patch is missing or defect there is no mechanism in place to fix it. The playout would be disrupted and a complete manifest file would need to be sent to the client device in order to provide the client device with the correct metadata. Hence, missing one or more patches may lead to a situation wherein playout is disrupted and the client device needs to download a large amount of redundant information.

The patch update schemes in this disclosure aim to reduce the problems associated with the conventional patch schemes as e.g. described in the MPEG DASH specification the client devices $106_{1-3}$ are configured to monitor patches it receives, to detect signals and/or events that indicate that a patch is missed and to request missed patches 114 from the network. To that end, the manifest file (MF) server 110 or another server entity in the network, is configured to receive a missed patch request from a client device, wherein the request may comprise information that can be used by the server to determine which patches were missed by the client device. In response to the missed patch request, the serve may sent the missed patches to a client device. The patches may be sent in a communication channel 118 between the client and the server. A client device may subsequently update the current manifest file it is using on the basis of the received missed patches. This way continuous playback of content, in particular live content and broadcast content, is guaranteed or at least the risk of a discontinuity in the playback is substantially reduced.

It is submitted that the media delivery system may be any type of delivery system for delivering content, e.g. CDN, IPTV, including different distribution techniques including unicast, multicast, broadcast and combinations thereof, etc. In particular, the media delivery system may be configured to delivery live-stream content and broadcast content, to client devices using the basis of a streaming protocol such as an HTTP adaptive streaming protocol.

The media delivery system may also be configured as a DASH over broadcast system. In such systems may comprise a network system for broadcasting segments to home devices that comprise an HTTP server configured to store the broadcasted segments. Some of the broadcasted segments may include an MPD or patches for MPDs. Client devices may playout the segments by connecting to the HTTP server on the home device and sequentially request and receive segments from the HTTP server. Patches that are missed by the client device may be requested from a server in the network via a separate communication channel using processes and functionalities described in this disclosure.

Figure 2:
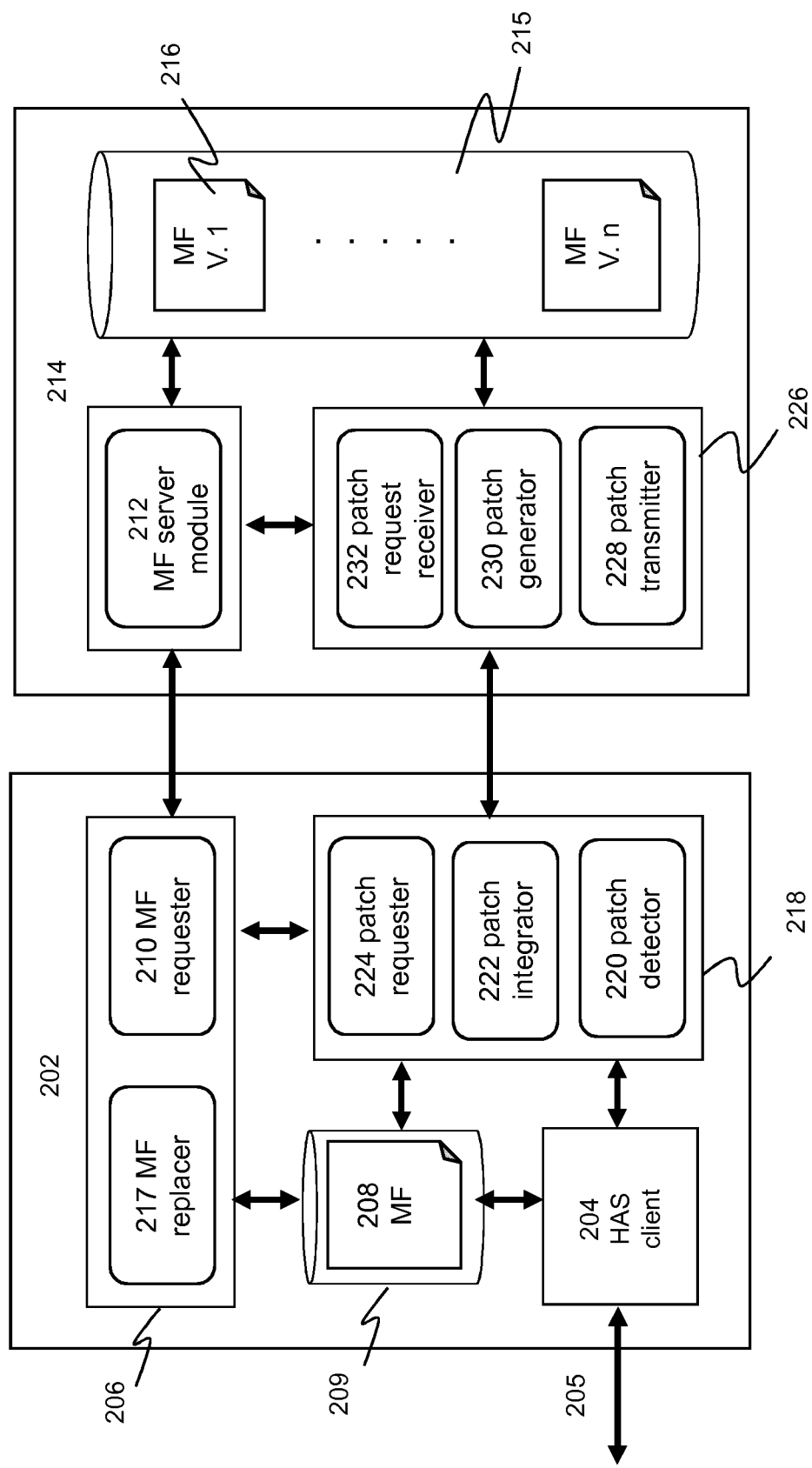
FIG. 2 depicts a client and a manifest file server configured for transmitting one or more missed patches to a client device according to an embodiment of the invention.

FIG. 2 depicts a schematic of a client device and a manifest file server configured for transmitting missed patches to the client device according to an embodiment of the invention. In particular, FIG. 2 depicts client device 202 comprising a HAS client 204 configured to render media data (e.g. audio-video (A/V) data) that are transmitted in segments to the client device. The HAS client may send request messages 205, e.g. HTTP requests, for media segments to one or more network nodes (not shown) on the basis of a manifest file (MF) 208 stored in a memory 209 of the client device. In response to the request messages, the network node may transmit the requested media segments to the client device which may buffer the media data in the segments, decode the media data and render the decoded media data on a display.

The MF requester module at the client device may be configured to communicate with a MF server module 212 in a server 214, which is configured to send a new version of a fully manifest file to the client device. The server and client may be part of a media distribution system as described with reference to FIG. 1.

The MF server module may be connected to an database 215, hereafter referred to as a MF database, comprising different versions of a manifest file 216 of a video title or information for constructing different versions of a manifest file. To that end, the MF server may store the full manifest file or each version of manifest file and determine a patch for a client device on the basis of the difference between two or more (stored) manifest file versions. Alternatively, and/or in addition, it may store the difference ("diff") between subsequent versions of a manifest file and use the difference for determining a patch of a client device.

Once the client device receives a new manifest file, a MF replacer 217 may be triggered to replace (overwrite) the whole manifest file stored in the memory of the client device with the retrieved manifest file. Here, the manifest file may be stored in the memory using a data format that enables the HAS client to efficiently parse and process the information in the manifest file.

Further, the client device may be configured to partially update the manifest file stored in the memory on the basis of a patch. Patches may be inserted in one of the segments that are transmitted during the streaming process to the client device. A patch client module 218 in the client device may be configured to monitor for patch information the client device receives. In particular, a patch detector 220 may monitor for patches received by the client device (e.g. received by the HAS client in segments and/or over a separate communication channel). When the HAS client receives patch information, e.g. a segment comprising a segment box (which may be referred to as an "event message box") with patch information, the patch detector 220 may trigger a patch integrator 222 to apply the patch to the manifest file, e.g. parse the patch information and execute the instructions in the patch information in order to partly modify the stored manifest file thus creating a new version of the MPD.

A patch may comprise an identifier for identifying the version of the manifest file that needs to be modified. In an embodiment, the version of a manifest file may be identified by a publish Time attribute. One or more instruction messages in a patch may instruct the patch integrator 222 to identify information parts in the stored manifest file and to replace the identified information parts with new information parts in the patch information. This way the manifest file may be partly updated on the basis of the information in the patch. The patch process allows for example insertion of a URL (e.g. a BaseURL attribute) that points to a location of a new network node that is capable of transmitting certain (media) segments to the client device.

Patches may be sent to the client device in segments comprising an event message box. Alternatively, and/or in addition, patches may be sent by a MF server to the client device over a separate communication channel. In particular, a patch transmitter 228 in a server patch module 226 in the MF server may be configured to transmit patch information, e.g. patch messages, to the patch client module 218 in order to partly update the dynamic manifest file stored in the memory of the client device.

When the instructions in the patch are successfully executed, the client device changes the version number of the partly updated manifest. However, as described above, patches may be missed by the client device thereby increasing the risk that the user experience may be severely degraded and a large amount of redundant information need to be downloaded from the network.

In order to solve this problem, the patch detector 220 may be configured to monitor patches received by the client device and to detect whether the client device has missed one or more patches. In particular, the patch detector may be configured to detect indications (signals or events) that one or more patches have been missed. Such indications may be detected on the basis of direct triggers and indirect triggers.

A direct trigger may occur e.g. when:
- the client device (or the patch detector associated with the client device) determines that a patch is received that refers to a version of a manifest file that does not match (e.g. is more recent) than the version of the manifest file the client device is currently using; or,
- the client device (or the patch detector associated with the client device) determines that a patch is received comprising an instruction (e.g. add/delete/replace relative) to an element that does not exist in the MPD the client device is using.

An indirect trigger may occur when the client device encounters one or more problems that can be related to the miss of one or more patches. Examples of such indirect triggers may include:
- an attempt to fetch a new segment fails (probably due to a URL change);
- the reception of the last segment in the MPD (implying that the list of segments is not up to date with the newly produced ones);
- the timer set on the minumumUpdatePeriod attribute of the MPD has elapsed indicating that there might be an update of the MPD available.

In this disclosure, a direct or indirect trigger (which may be related to a specific error code) may be referred to as a missed patch indication. Once the patch detector detects or receives an indication that one or more patches have been missed (on the basis of a direct or indirect trigger), it may notify a patch requester 224 to send a patch request to the MF server for transmitting the missed patches, i.e. patches sent to the client device but not applied by the client device to the manifest file it is using.

The patch request may comprise information that allows a patch generator 230 in the MF server to select or construct one or more patches that were missed by the client device on the basis of information stored in the MF database 215. In response to the patch request, the MF server may send the following information to the client device:
- one or more patches; in which case the patch client module may integrate the patch information in the manifest file;
- a new manifest file; in which case the client will replace the old version with the new version of the manifest file;

an empty body; which indicates that the manifest file at the client is up to date.

Hence, the client device may comprise functionality best described as a patch detector for monitoring patch information received by the client device and for detecting triggers, which may be referred to as "missing patch triggers", that may indicate that one or more patches are missed.

If a missing patch trigger is identified by the patch detector, the client device, in particular the patch detector associated with the client device, may determine the current version of the manifest file the client device is using. A manifest file version may be identified on the basis of information associated with the manifest file, e.g. one or more manifest file version identifiers. In an embodiment, the version information may include a time parameter, e.g. a time-stamp or the like, indicating a time the manifest file was last changed or published (e.g. made available to client devices).

In an embodiment, in case of a DASH MPD, the so-called publish time of an MPD may be used as an MPD version identifier. The publish time may be contained in the MPD as an attribute of the <MPD> root element. In this case, the MPD publish time in combination with the MPD name may uniquely identify a version of a MPD file.

In another embodiment, an MPD version parameter may be implemented on the basis of a hash value, for example a hash value of (part of) the MPD. Both client and MF server should be able to compute hash values for (MPD) files. Hence, in that case, the hash value will uniquely define a version of a manifest file.

In another embodiment, the ETag scheme as described in rfc7232 section-2.3 may be used for determining different versions of a manifest file. In the ETag scheme, a MF server may assign a unique value string (e.g. a hash value or the like) to each version of a manifest file. When transmitting a manifest file to a client device on the basis of a HTTP response message, e.g. an HTTP 200 OK message, the corresponding ETag may be inserted in the header of the HTTP response message. When receiving the manifest file, the client device may extract the ETag from the HTTP header. In this case, the ETag will uniquely identify a version of a manifest file.

The patch detector may identify the MPD version that is currently used by the client device. It may determine the version of the MPD on the basis of an MPD version parameter associated with the MPD, as described above (e.g. an MPD version parameter in the form of a publishTime, a hash or another unique identifier as e.g. provided in the ETag scheme).

In an embodiment, the information that is indicative of the MPD version that is currently used by the client device may be referred to as a currentmpd identifier. For example, the value of the publishTime may be used as currentmpd identifier.

A missing patch trigger may be identified (detected) by the patch detector if the patch detector determines that the client device receives a patch referencing a manifest file version that does not match, e.g. is more recent than, the manifest file version of the manifest file that is currently used by the client device. The patch detector may determine that this patch is the first patch received on or after the detection of one or more missed patches. Hence, the patch detector may determine at least the first patch received on or after detection of the one or more missed patches (or, alternatively phrased, the "oldest" newly received patch). The information that is indicative of the MPD version that is referenced in the thus determined first patch received on or after the detection of one or more missed patches is referred to as the currentmpd identifier in this invention.

Figure 3:
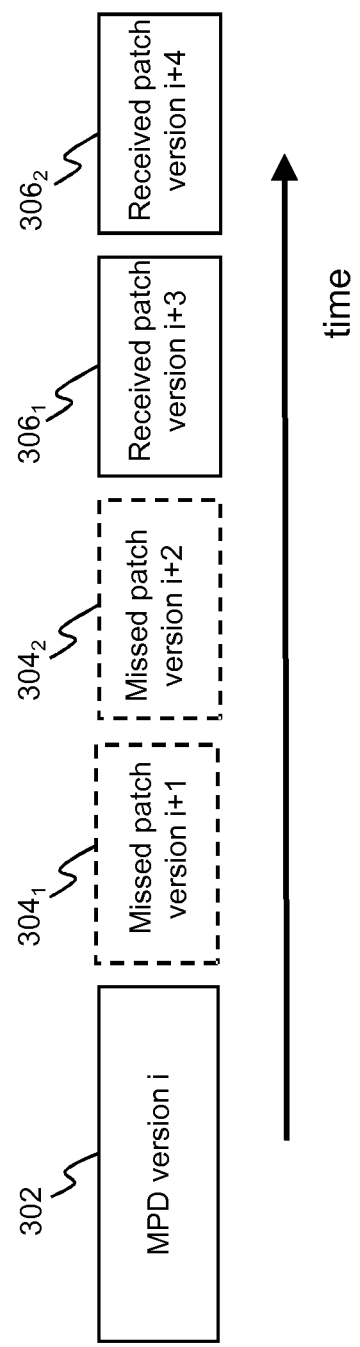
FIG. 3 depicts an example of a flow of patches for a client device according to an embodiment of the invention.

FIG. 3 depicts an example of a flow of patches for a client device according to an embodiment of the invention. In particular, FIG. 3 depicts an example of a flow of patches for a client device that has version i of an MPD 302 stored in its memory. Patches $304_{1,2}$ for updating the MPD to version i+1 and i+2 are missed by the client device, e.g. not received, while the subsequent patches $306_{1,2}$ for updating the MPD to version i+3 and i+4 are received. In that case, the patch detector may determine that the client device receives a patch that refers to a version of a manifest file that is more recent than the version of the manifest file the client device is currently using. As shown in FIG. 3, in an embodiment, the missed patches may be determined on version information of the current MPD and one or more patches received on or after detection that one or more patches were missed, preferably the first patch $306_1$ received on or after detection that patches were missed.

Information that enables the server patch module to determine which patches are missed by a certain client may hereafter referred to as missed patch information. This information may include (but not limited to):
  an MPD version identifier identifying the version of the current MPD used by the client (referred to as the "currentmpcf" identifier), and/or,
  an MPD version identifier identifying the MPD that is referenced in the patch that was received on or after detection of missed patches (referred to as the "missedmpcf" identifier)

Here, the missedmpd identifier refers to the MPD version that would be available at the client device after having applied the missed patch(es) to it. Instead of the "missedmpcf" identifier, a patch identifier may be used wherein the patch identifier may be an explicit identifier associated with the patch.

The missed patch information may be sent by the client device to the MF server. In particular, the patch requester 224 may send the missed patch information in a patch request message to a patch request receiver 232 in the server patch module. The missed patch information enables a patch generator 230 to determine the patches that were missed by the client device. This way, it can be ensured that only non-redundant information is sent by the MF server to the requesting client device.

The missed patch information sent to the MF server may further include a publish time (e.g. a time stamp or the like) indicating the data and/or time the manifest file was last changed. For example, the missedmpd parameter may be sent to the MF server in the form of the publish time of the MPD that one would have obtained when applying all the patches up to the last missed patch. The value of this parameter may be derived from the first patch received after the missed patch(es). Consequently, this parameter is usually present in the missing patch information when missed patches have been detected via a direct trigger (e.g. upon receipt of a patch referencing an MPD having a more recent version than the MPD available at the client). In an embodiment, the missedmpd parameter value may be reported in the patch within the XPath selector of the last <replace> tag.

The patch requester may request a patch on the basis of the identifier of the current MPD available at the client, and one or more patches that were received after detection of misses patches. To this end, the client may send missing patch information in the form of one or more query strings containing missed patch information. An example of such patch request message in the form of an HTTP GET request message may look as follows:
   GET URI HTTP/1.1
   with:
   URI=Scheme ":" mpd-address ["?" query1 & [query2]]
   mpd-address=[address of the MPD for this streaming resource]
   query1="currentmpd=" [publish-time]
   query2="missedmpd=" [publish-time]

In an embodiment, the value of "currentmpd" parameter may be the same as that of the value of the attribute "@publish Time" of the <MPD> tag in the MPD file available at the client. Similarly, in an embodiment, the value of "missedmpd" parameter may be the same as that of the value of the attribute "@publish Time" of the MPD that would have been generated when all the patches up to the last missed patch on or after detection of one or more missed patches is applied to the MPD. Here, the patch request message may comprise one or more optional parameters, e.g. string parameters. In the example above, query1 and query2 may be optional query string parameters. In case query2 is present, query1 is required as well.

On the basis of the above-described syntax, an example of an HTTP patch request for requesting a missed patch of the manifest file called sample.mpd may look as follows:
   GET http://cdn1.example.com/sample.mpd?currentmpd=2015-05-06T07:37:19Z&missedmpd=2015-05-06T07:52:21Z HTTP/1.1

In this example, the client device uses the patch request message to signal the MF server that it is requesting one or more patches within a predefined time period, e.g. in example the period defined between publish times 2015-05-06T07:37:19 and 2015-05-06T07:52:21.

In a further embodiment, a patch request may be initiated by the patch detector detecting an indirect trigger (e.g. in a situation wherein the patch detector receives an indication that one or more patches have been missed and further determines that the client device has not yet received a new patch with a mismatching publish time). In that situation, the patch requester may generate a patch request that only comprises an indication of the version of the MPD the client device is using, i.e. currentmpd parameter value. This parameter may be inserted as a query string in the HTTP message described above. For example, the patch requester may generate a patch request which may look as follows:
   GET http://cdn1.example.com/sample.mpd?currentmpd=2015-05-06T07:37:19Z Hence, in that case, the MF server may receive the patch request and extract the currentmpd parameter value, which—in this example—refers to a publishTime, e.g. the date and time the MPD of the client was last modified. Upon receipt of the patch request, the MF server may further link the patch request of the client device with a time at which the patch request was received by the MF server (e.g. the patch request receiver). In an embodiment, the patch request receiver may generate a time stamp patchRequestArrivalTime associated with the time the patch request was received. Then, the thus obtained time information (the currentmpd and patchRequestArrivalTime) is subsequently used by the patch generator in order to determine the patches that were sent in the period between currentmpd and patchRequestArrivalTime.

When the patch request information comprises identifiers that are based on MPD publish times, such as mentioned above, the MF server may need to be DASH aware, because it needs to be able to pars MPD files in order to identify which ones the patch request refers to. On the other hand, if the patch request information comprises identifiers based on MPD hashes or ETags, the MF server may not need to be DASH aware in order to identify the corresponding MPDs.

Instead of an HTTP GET request message, other HTTP messages may be used for a patch request, e.g. a HTTP POST request, wherein the missed patch information may be inserted in the request body. In another embodiment, a new HTTP request, an HTTP DIFF request, may be used wherein missed patch information may be sent in the header or in the body of the HTTP message. In yet another embodiment, the missed patch information may be send in a Server and Network Assisted DASH (SAND) message, a messaging protocol between DASH client and DASH server wherein the client may transmit (periodic) "status updates" to the server regarding the missed patch information.

In a further embodiment, the patch requester may send a patch request that does not comprise any query string parameter. The patch request receiver may interpret such patch request message as a request for a new (full) MPD. In an embodiment, the requested patch may be sent by the patch sender in the MF in a response message to the client device, e.g. a HTTP 200 OK response.

As already described above, the missing patch scheme described in this disclosure includes a server patch module comprising functionalities to support the client patch module in the client device. Hence, when the MF server, in particular a patch request receiver in the MF server, receives a patch request message, e.g. a HTTP GET request as described above, it may inspect whether such a request contains a query string or not. In case it does not contain a query string, the server assumes that the client device is requesting a full MPD. Hence, in that case, the MF server module may send a full MPD in a response message to the client device.

In case the request contains a query string comprising query parameters as described above, the patch request receiver determines that the client device is requesting an MPD patch and extracts the parameter currentmpd and missedmpd (if available) which will be used in order to identify the time period for which one or more patches need to be created by the patch generator.

In case a server does not support the patch request mechanism and receives a patch request message comprising a query string, it may return the requested resource without considering the query string. Hence, in that case, the full MPD will be returned by the MF server to the client device.

Once the patch request receiver has identified that the client device has requested one or more patches for a specific "gap" among MPD versions, the patch generator may determine the one or more patches that need to be sent to the client device. This may lead to the following three situations.

If the version of the MPD at the client device is up-to-date, no update needs to be sent to the client device.

If the version of the MPD at the client device is not up-to-date, the patch generator may decide to create one or more patches for the client device and to forward the patches to the patch sender for transmission to the client device. In an embodiment, the server may keep the latest version of the MPD (say: version n), plus the differences ("diffs") between k previous versions (i.e. the diff between MPD version n and n−1, $\text{diff}_{n,n-1}$; the diff between MPD version n−1 and n−2, $\text{diff}_{n-1,n-2}$; and so on until $\text{diff}_{n-k+1,n-k}$).

Figure 4:
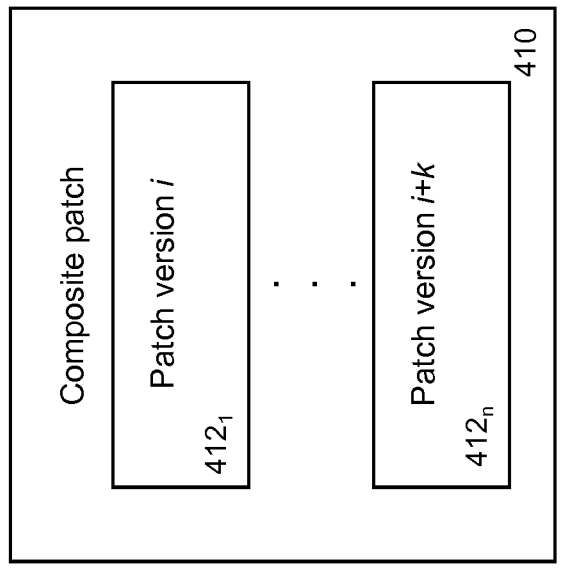
FIG. 4 depicts a composite patch according to an embodiment of the invention.

These "diffs" may be (part of) the "patches" that a server would embed in a segment block according to the standard patch mechanism of MPEG DASH. These patches may have a similar format as the patch as described above with reference to example 2. When a client device requests a patch referring to the "gap" between version i and version j of the MPD and the latest version available at the server is version n (with n>j>i), the server may concatenate the diff files from $\text{diff}_{i,i+1}$ until $\text{diff}_{j-1,j}$ in order to create a "composite patch". Such composite patch file is illustrated in FIG. 4 depicting a composite file container 410 comprising one or more patches $412_{1-k}$ wherein the patches are selected on the basis of the missing patch information in the patch request.

In case only one diff file is needed (the case where j=n=i+1) may be referred to as an "atomic patch". An atomic patch will look like a patch as described with reference to example 2 above. In an embodiment, a composite patch may be constructed as a concatenation of two or more standard patches. This way, the MF server may support both a standard patch mechanism (e.g. the patch mechanism as described in the MPEG DASH standard) as well as the missed patch request mechanism which is the object of this disclosure.

Under certain circumstances, the MF server may decide not to create a patch (for example in case creating the patch for this client takes too much computational time/effort, or when the MPD version at the client is too old), but rather send the full MPD.

In that case, the response of the MF server to the client device may signal to the client device whether the response's body contains an MPD, a patch or no update at all. For example, in case there is no update of the MPD available at the server, the patch generator may construct a response message, e.g. an HTTP 200 OK response message, with empty body. This message may inform the client device that the current version of the manifest file it is using is up-to-date.

In case the MF server decides to send one or more patches to the client device that is generated by the patch generator on the basis of missing patch information in the patch request, the patch sender may construct a response message, e.g. a HTTP 200 OK response, comprising a body containing one or more patches. In an embodiment, the one or more patches may be implemented as an XML document comprising one (for the atomic patch) or more (for the composite patch) diff document(s) similar to the patch described with reference to example 2 above.

Figure 5:
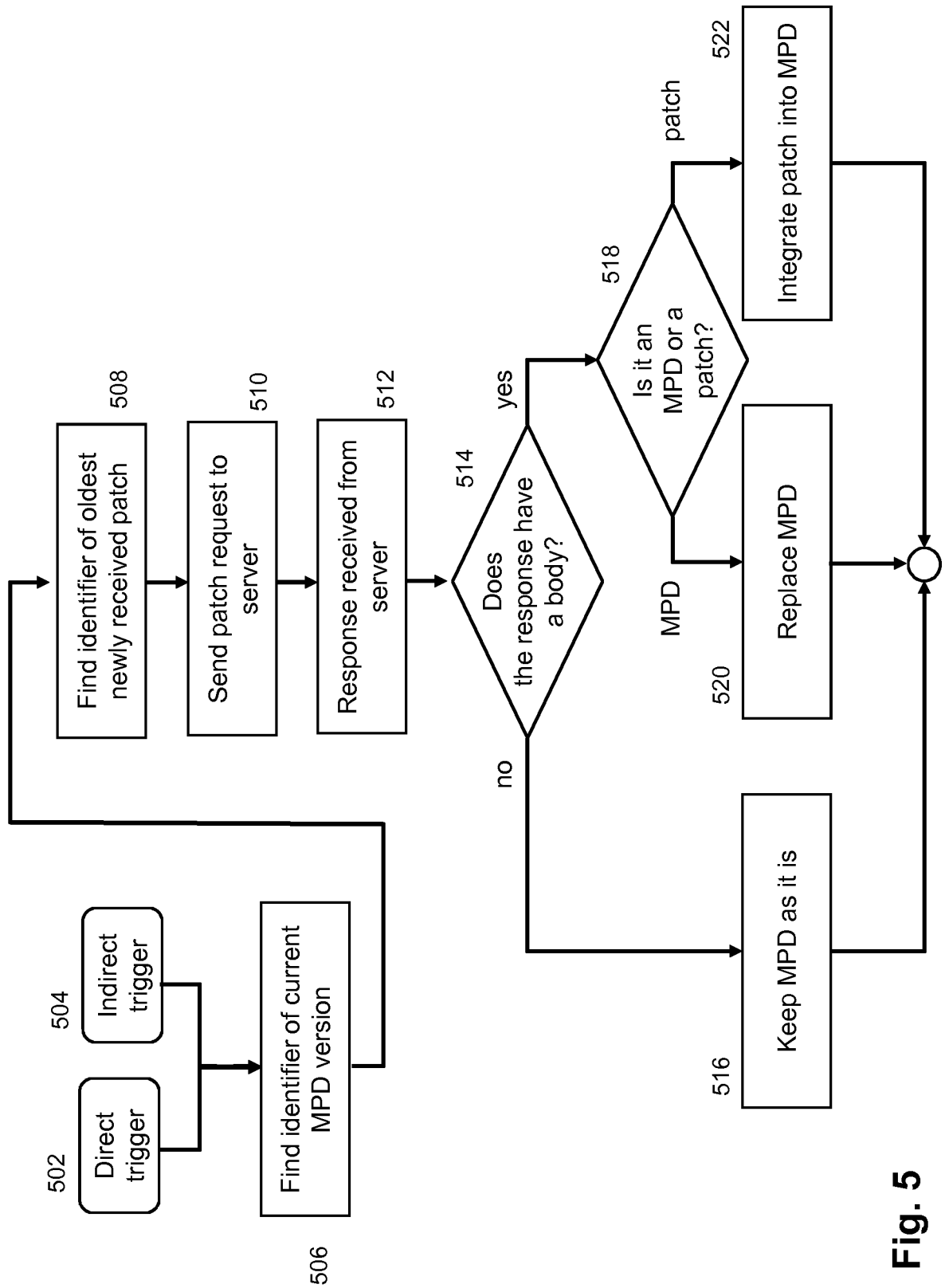
FIG. 5 depicts a flow chart of a client-side process for transmitting one or more missed patches to a client device according to an embodiment of the invention.

In case the server decides not to send the patch but rather a full manifest file, the patch generator may construct a response message, e.g. an HTTP 200 OK response, comprising a body comprising a full manifest file. In an embodiment, the client device may be configured to distinguish whether it is receiving a full manifest file or a patch by inspecting the content of the response message. In an embodiment, the response message may comprise an information element that is indicative whether the response message comprises a patch or a manifest file. For example, in case the response message comprises an XML document, an XML tag relative to the root element may signal the client device whether the response message comprises a patch or a manifest file. For example,

- a tag <MPD> may indicate that the body of the response contains a full MPD
- a tag <diff> may indicate that the body of the response contains an MPD patch FIG. 5 depicts a flow chart of a client-side process for updating a manifest file according to an embodiment of the invention. The process may start with the client device detecting or receiving direct trigger (step 502) or an indirect trigger (step 504) that one or more patches have been missed by the client device. The client device may then determine an identifier of the current MPD version (step 506) and, optionally, an identifier of the MPD referenced by the first patch received on or after detection of the missed patch(es)) (step 508). These identifiers may be send as missing patch information in a patch request message to a MF server (step 510).

In response to the patch request message, the client device may receive a response message from the server (step 512). The client device may determine if the response message comprises a body (step 514) and if the response message does not comprise a body, the client device does not execute an MPD update (step 516).

If the response message comprises a body, the client device may determine whether the body comprises a patch or an MPD (step 518). In case the response message comprises an MPD, the client device may replace the current MPD with a new version of the MPD contained in the response message (step 520). In case the response message comprises a patch, the client device partly updates the content of current MPD on the basis of the instructions in the patch (step 522). This update process also includes updating the MPD version identifier.

Figure 6:
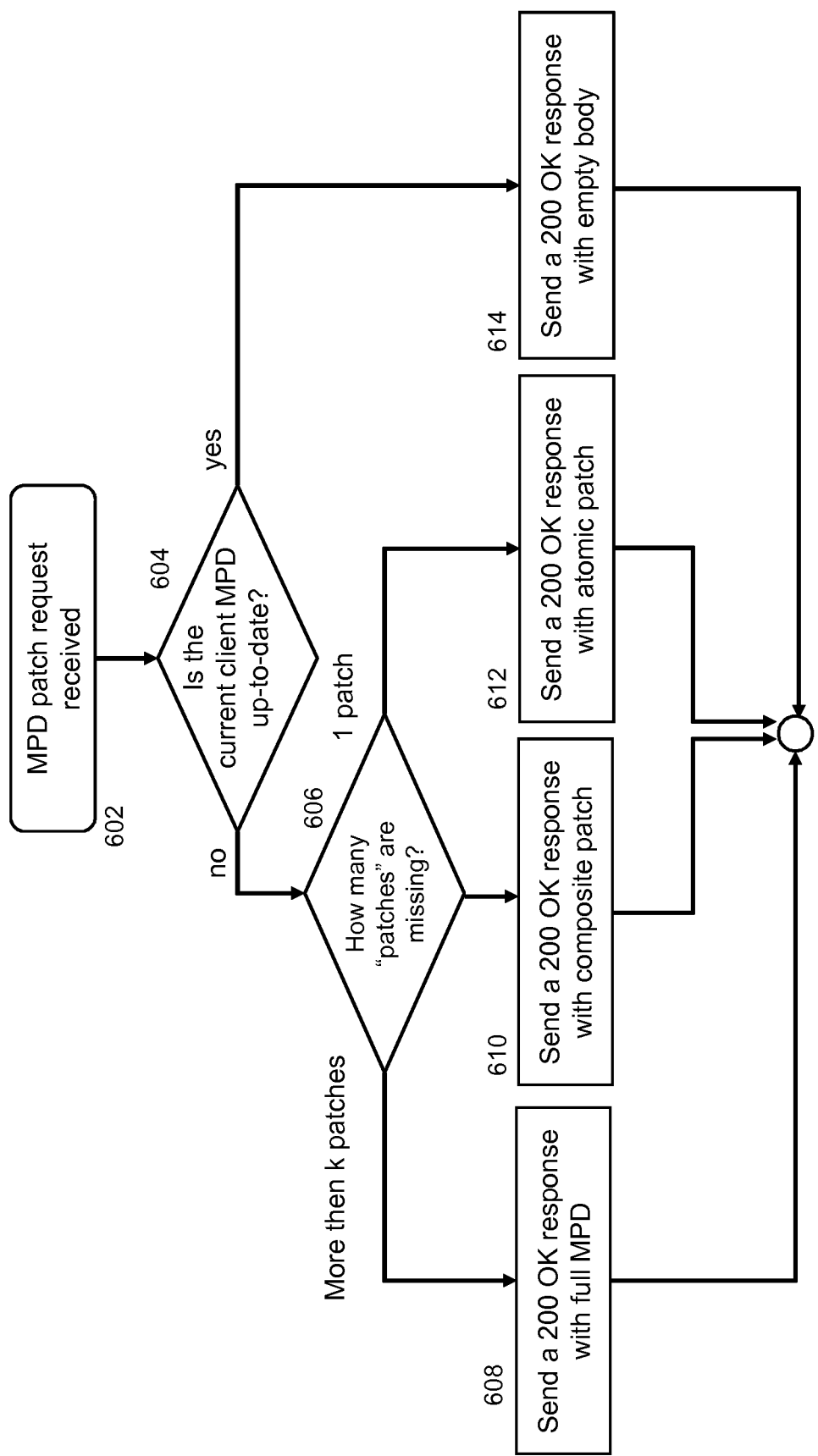
FIG. 6 depicts a flow chart of a network-side process for transmitting one or more missed patches to a client device according to an embodiment of the invention.

FIG. 6 depicts a flow chart of a network-side process for updating a manifest file according to an embodiment of the invention. This process may be executed by the a server application in the network. The process may start with the server receiving a patch request comprising missing patch information from a client device (step 602). The server may determine on the basis of the missing patch information if the MPD that is used by the client device is up to date (step 604). If it up-to-date, the server may signal the client device that the MPD it is using is up-to-date. The server may signal the client device this information on the basis of a response message, e.g. an 200 OK message, comprising no body (an empty body).

Alternatively, if the server determines that the MPD is not up-to-date, it may use the missing patch information for determining how many patches are missing (step 606). If one patch is missing, the server may send a response message comprising the missing patch to the client device (step 612). In case, a plurality of patches are missing, the server may send a response message comprising a composite patch, comprising a plurality of atomic patches to the client device (step 610) or alternatively, in case, the number of missed patches is above a predetermined threshold, the server may determine that too many patches have been missed for updating the MPD on the basis of patches. In that case, the server may decide to send a new version of a full MPD to the client device (step 608).

Instead of an HTTP response message, other ways of providing one or more patches to a client device are possible. For example, in an embodiment, the server may transmit a link to a URI to the client device, which can be used by the client device to download the requested one or more patched. Alternatively, in another embodiment, the one or more patches may be sent in one or more one or more Server and Network Assisted DASH (SAND) messages from the DASH server to the DASH client device. In yet another embodiment, a server-side events (SSE) system, may be used wherein a webserver pushes patches as updates to a client device after the client device has established a TCP connection with the SSE webserver.

In an embodiment, the client device may be signaled by the network that it can request missing patches. To that end, in an embodiment, the MPD may comprising information for signaling the client device that the MF server is configured to receive patch requests and to send missed patches to the client device. In an embodiment, a UrlQueryInfo element in the MPD may signal the client device that a missing patch request mechanism is supported and that the missing patch information may be sent by the client device to a server on the basis of a patch request message comprising a query string that is similar to the one described above. The UrlQueryInfo element is introduced in the draft of the MPEG DASH standard MPEG DASH, "Information Technology—Dynamic adaptive streaming over HTTP (DASH)—Part 1: Media presentation description and segment formats/Amendment 2: Spatial Relationship Description, Generalized URL parameters and other extensions", ISO/IEC FDAM 23009-1:2015(E), ISO-IEC_23009-1_A2_(E).doc, 25-02-2015 in order to allow the flexible insertion of information in query string parameters of the HTTP segment requests.

This element may be defined as a child of EssentialProperty element and SupplementalProperty element, which are in turn elements that may be present at MPD, AdaptationSet and Representation level (SupplementalProperty may be present at Period level too).

In an embodiment, the UrlQueryInfo element may be extended with two identifiers for URL parameter templates, $currentmpd:xpath$ and $missedmpd:xpath$. The semantics of these identifiers are described hereunder in more detail:

TABLE I

New identifiers for URL parameter templates

| $<ParamIdentifier>$ | Substitution parameter |
| --- | --- |
| $currentmpd:xpath$ | This identifier is substituted with the value of the XML element or attribute addressed by the xpath parameter. The xpath parameter is an address specified according to the XPath language and it represents an identifier of the current version of the MPD present at the client (example: if xpath equals /MPD/@publisTime then xpath is substituted, in the reconstructed query string, with the value of the publish Time attribute of the client's current MPD). |
| $missedmpd:xpath$ | This identifier is substituted with the value of the XML element or attribute addressed by the xpath parameter. The xpath parameter is an address specified according to the XPath language and it represents an identifier of a version of the MPD that the oldest newly received patch is meant to be applied to (example: if xpath equals /MPD/@publisTime then xpath is substituted, in the reconstructed query string, with the value of the publishTime attribute of the MPD that the oldest newly received patch is meant to be applied to). |

In an embodiment, the extended URLQueryInfo would be defined within a new namespace, e.g. "urn:mpeg:dash: schema: urlparam:2016" for signaling the client device that the extended URLQueryInfo parameters may be used. In an embodiment, a preferred place for the SupplementalProperty or the EssentialProperty carrying this type of UrlQueryInfo is as a child of the MPD element, since it is meant to signal patches of the MPD itself.

With reference to the MPD described above in example 1, the following example below illustrates how the MPD may be modified to add the extended UrlQueryInfo element that informs the client device that it may perform a patch request for missing patches:

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011
  DASH-MPD.xsd"
  type="dynamic"
  minimumUpdatePeriod="PT2S"
  timeShiftBufferDepth="PT30M"
  availabilityStartTime="2015-05-06T07:31:03"
  minBufferTime="PT4S"
  publishTime="2015-05-06T07:37:19Z"
  profiles="urn:mpeg:dash:profile:isoff-live:2011">
  <BaseURL>http://cdn1.example.com/sample.MPD</BaseURL>
  <SupplementalProperty schemeIdUri="urn:mpeg:dash:urlparam:2016"
xmlns:up="urn:mpeg:dash:schema:urlparam:2016">
  <up:UrlQueryInfo
queryTemplate="currentmpd=$currentmpd:/MPD/
@publishTime$&missedmpd=$missedmpd:/MPD/@publishTime$"/>
  </SupplementalProperty>
  <Period id="1">
  ...
  </Period>
</MPD>
```

Example 4: MPD Extended for Supporting a "Patch Request" Mechanism According to an Embodiment of the Invention As shown in this example, the MPD may comprise an indication that a new namespace for the URLQueryInfo is used, thereby signaling the client device that an extended version of the URLQueryInfo element is used. Further, the MPD comprises the URLQueryInfo element (enclosed in the SupplementalProperty as mandatory by the MPEG standard) signaling the client device that missing patch information may be sent to the server on the basis of a string query in a HTTP GET message.

Instead of using an indicator in the MPD for signaling the client device that the MF server is configured to receive patch requests and to send missed patches to the client device, such indication may also be induced in the HTTP response that is send in response to a request of an MPD.

In a further embodiment, the MF server and the client device may inform each other on their capabilities for processing missing patch requests on the basis of one or more Server and Network Assisted DASH (SAND) messages between the UE and the MF server.

Although the MPD example above relates to an MPD of a live-streaming event (the MPD profile urn:mpeg:dash: profile:isoff-live:2011 signals the client device that it is an MPD for live-streaming), it is submitted that the invention may be used for any type of manifest file may be partly updated. For example, the patch update mechanism according to the invention may also be used for updating an MPD that is used for broadcasting content to client devices. In that case, the MPD may include an MPD profile for signaling the client device that the MPD is used for broadcasting. In more general, the patch update mechanism according to the invention may also be used for updating any manifest file that is allowed to be modified during media playout. Such manifest file is typically referred to as a dynamic manifest file.

Figure 7:
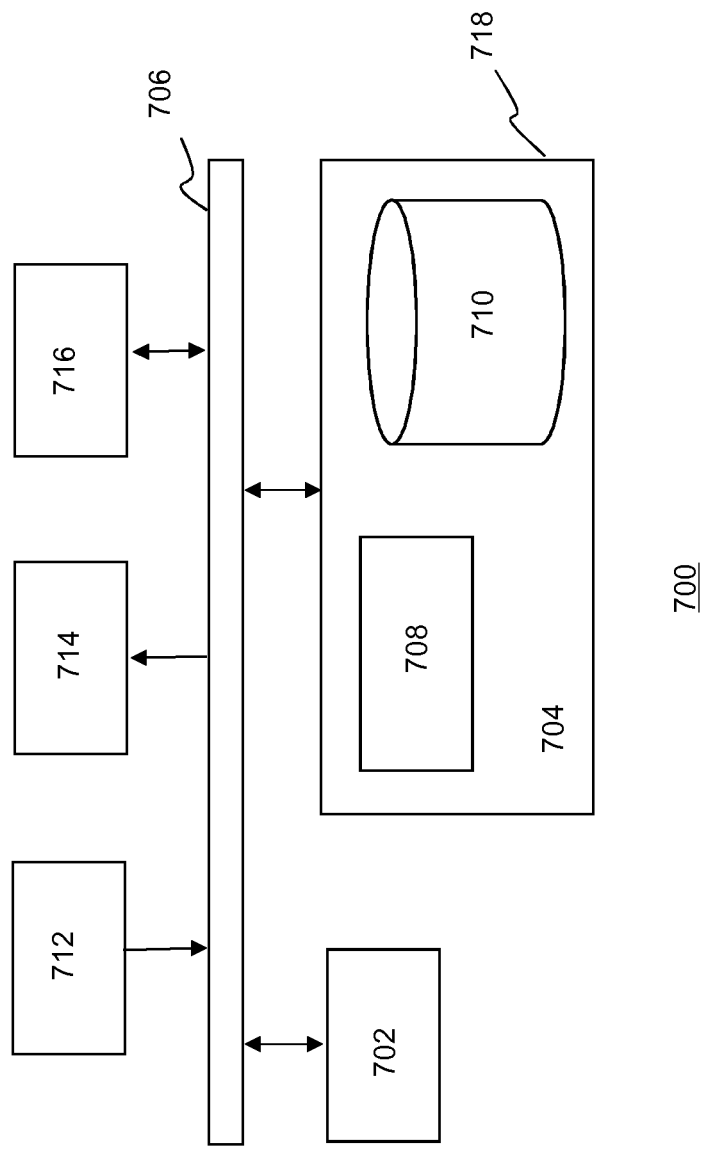
FIG. 7 depicts a block diagram illustrating an exemplary data processing system that may be used in as described in this disclosure.

FIG. 7 is a block diagram illustrating an exemplary data processing system that may be used in as described in this disclosure. Data processing system 700 may include at least one processor 702 coupled to memory elements 704 through a system bus 706. As such, the data processing system may store program code within memory elements 704. Further, processor 702 may execute the program code accessed from memory elements 704 via system bus 706. In one aspect, data processing system may be implemented as a computer that is suitable for storing and/or executing program code. It should be appreciated, however, that data processing system 700 may be implemented in the form of any system including a processor and memory that is capable of performing the functions described within this specification.

Memory elements 704 may include one or more physical memory devices such as, for example, local memory 708 and one or more bulk storage devices 710. Local memory may refer to random access memory or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from bulk storage device 710 during execution.

Input/output (I/O) devices depicted as input device 712 and output device 714 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 716 may also be coupled to data processing system to enable it to become coupled to other systems, computer systems, remote network devices, and/or remote storage devices through intervening private or public networks. The network adapter may comprise a data receiver for receiving data that is transmitted by the systems, devices and/or networks to the data and a data transmitter for transmitting data to the systems, devices and/or networks. Modems, cable modems, and Ethernet cards are examples of different types of network adapter that may be used with data processing system 750.

As pictured in FIG. 7, memory elements 704 may store an application 718. It should be appreciated that data processing system 700 may further execute an operating system (not shown) that can facilitate execution of the application. Application, being implemented in the form of executable program code, can be executed by data processing system 700, e.g., by processor 702. Responsive to executing application, data processing system may be configured to perform one or more operations to be described herein in further detail.

In one aspect, for example, data processing system 700 may represent a client data processing system. In that case, application 718 may represent a client application that, when executed, configures data processing system 700 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 718, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for enabling transmission of one or more missed patches to a HTTP adaptive streaming (HAS) client device, comprising:
   the client device detecting that one or more patches have been missed by the client device, each of the one or more patches comprising information for updating at least part of a manifest file used by the client device wherein the manifest file is a dynamic manifest file which comprises location information of a server that is configured to determine the one or more missed patches on the basis of one or more identifiers that are indicative of manifest file versions;
   the client device determining a first identifier indicative of a manifest file version of the manifest file used by the client device; and,
   the client device sending the first identifier to the server for enabling the server to determine one or more missed patches on the basis of the first identifier and to transmit the missed patches to the client device;
   wherein the first identifier is sent in a patch request message to the server and wherein the patch request message is an HTTP message;
   wherein the patch request message comprises a first parameter indicative of the manifest file version the client device is using.

2. Method according to claim 1 wherein the detecting comprises:
   the client device receiving a patch that cannot be applied to the manifest file used by the client device;
   the client device determining a second identifier indicative of a patch version of the received patch that cannot be applied; or, indicative of a manifest file referenced in the received patch that cannot be applied;
   the client device sending the second identifier to the server in a second patch request message for enabling the server to determine one or more missed patches on the basis of the first and second identifier.

3. Method according to claim 2 wherein the second patch request message comprises a second parameter indicative of the patch version of the received patch that cannot be applied; or, indicative of the manifest file referenced in the received patch that cannot be applied.

4. Method according to claim 1 further comprising:
the client device receiving the one or more missed patches; and
applying at least part of the one or more missed patches to the manifest file.

5. A method for transmitting one or more missing patches to a HTTP adaptive streaming (HAS) client device, comprising:
receiving from said client device, at a server, a first identifier indicative of a manifest file version of a manifest file that is used by the client device, wherein the manifest file comprises location information of the server and wherein the first identifier is sent in a patch request message, the patch request message comprising a first parameter indicative of the manifest file version the client device is using, wherein the patch request message is an HTTP message;
determining whether one or more patches were missed by the client device on the basis of at least the first identifier; and,
if it is determined that one or more patches were missed by the client device, transmitting at least part of the one or more missed patches to the client device.

6. Method according to claim 5 further comprising:
receiving a second identifier indicative of a patch version of at least one patch received by the client device; or, indicative of a manifest file version referenced by at least one patch received by the client device; and,
determining whether one or more patches were missed by the client device on the basis of the first and second identifier.

7. Method according to claim 5 comprising:
using the first identifier, the second identifier and version information for determining if one or more patches were missed by the client device, the version information being stored on a storage medium and comprising information on manifest files and/or patches that were transmitted to the client device before the client device detected that one or more patches have been missed by the client device.

8. A server for transmitting manifest file update information to a HTTP adaptive streaming (HAS) client device comprising:
a computer readable storage medium having computer readable program code embodied therewith, and a microprocessor, coupled to the computer readable storage medium, wherein responsive to executing the first computer readable program code, the processor is configured to perform executable operations comprising:
receiving from said client device, a first identifier indicative of a manifest file version of a manifest file that is used by the client device wherein the manifest file comprises location information of the server and wherein the first identifier is sent in a patch request message, the patch request message comprising a first parameter indicative of the manifest file version the client device is using, wherein the patch request message is an HTTP message;
determining whether one or more patches were missed by the client device on the basis of at least the first identifier; and,
if it is determined that one or more patches were missed by the client device, transmitting at least part of the one or more missed patches to the client device.

9. A server according to claim 8 wherein the server is connectable to, or comprises, a storage medium comprising version information on manifest files and/or patch versions that were transmitted to the client device, the executable operations further comprising:
receiving a second identifier indicative of a patch version of at least one patch received by the client device; or, indicative of a manifest file version referenced by at least one patch received by the client device; and,
determining whether one or more patches were missed by the client device on the basis of the first and second identifier;
using the first identifier, second identifier and the version information for determining if one or more patches were missed by the client device.

10. A HTTP adaptive streaming (HAS) client device, configured for requesting a server transmission of manifest file update information, the client device comprising:
a computer readable storage medium having at least part of a program embodied therewith, the computer readable storage medium comprising a manifest file; and,
a computer readable storage medium having computer readable program code embodied therewith, and a processor coupled to the computer readable storage medium, wherein responsive to executing the computer readable program code, the processor is configured to perform executable operations comprising:
detecting that one or more patches have been missed by the client device, each of the one or more patches comprising information for updating at least part of the manifest file, used by the client device, wherein the manifest file comprises location information of a server that is configured to determine the one or more missed patches on the basis of one or more identifiers that are indicative of manifest file versions;
determining a first identifier indicative of a manifest file version of the manifest file used by the client device; and,
sending the first identifier to the server for enabling the server to determine one or more missed patches on the basis of the first identifier and to transmit the missed patches to the client device;
wherein the first identifier is sent in a patch request message to the server and wherein the patch request message is an HTTP message;
wherein the patch request message comprises a first parameter indicative of the manifest file version the client device is using.

11. A client device according to claim 10, wherein responsive to executing the computer readable program code, the processor is further configured to perform executable operations comprising: receiving a patch that cannot be applied to the manifest file used by the client device; the client device determining a second identifier indicative of a patch version of the received patch that cannot be applied; or, indicative of a manifest file referenced in the received patch that cannot be applied; the client device sending the second identifier to the server for enabling the server to determine one or more missed patches on the basis of the first and second identifier.

12. Non-transitory computer-readable storage media comprising a manifest file for use by a HTTP adaptive streaming (HAS) client device, the manifest file comprising computer readable program code, the code comprising:
an identifier indicative of the version of the manifest file wherein the manifest file comprises location information of a server that is configured to determine one or more missed patches on the basis of one or more identifiers that are indicative of manifest file versions;
one or more chunk identifiers for enabling the client device to request chunks from a media server; and, a missed patch request indicator for signaling to the client device that a patch request message that is an HTTP message can be sent to a server if the client device detects that one or more patches have been missed by the client device, and a parameter for signaling the client device that the manifest file is a dynamic manifest file that can be updated on the basis of a patch.

13. Non-transitory computer-readable storage media comprising software code portions configured for, when run in the memory of a computer, executing the method steps according to claim 1.

14. Method according to claim 6 wherein the second identifier is included as a second parameter in a second patch request message sent by the client device.

* * * * *